United States Patent [19]

Blauhut et al.

[11] Patent Number: 4,601,193
[45] Date of Patent: Jul. 22, 1986

[54] MEASURING CIRCUIT FOR IONIC CURRENT MEASUREMENT

[75] Inventors: Reinhold Blauhut; Boguslaw Maciejewski, both of Werdohl, Fed. Rep. of Germany

[73] Assignee: Atlas Fahrzeugtechnik GmbH, Werdohl, Fed. Rep. of Germany

[21] Appl. No.: 664,169

[22] Filed: Oct. 24, 1984

[30] Foreign Application Priority Data

Nov. 2, 1983 [DE] Fed. Rep. of Germany ....... 3339569

[51] Int. Cl.$^4$ ...................... G01L 23/22; G01N 27/70
[52] U.S. Cl. ...................................................... 73/35
[58] Field of Search ................... 73/35, 115; 123/425, 123/435

[56] References Cited

U.S. PATENT DOCUMENTS 4,359,893 11/1982 Kizler et al. ......................... 73/115

FOREIGN PATENT DOCUMENTS 1229785 12/1966 Fed. Rep. of Germany .
2144453 3/1973 Fed. Rep. of Germany .
2507286 8/1975 Fed. Rep. of Germany .
2802202 7/1979 Fed. Rep. of Germany .
2935725 3/1980 Fed. Rep. of Germany .
2851075 6/1980 Fed. Rep. of Germany .
2939690 4/1981 Fed. Rep. of Germany .
3151415 7/1983 Fed. Rep. of Germany .

OTHER PUBLICATIONS

"Uber die Ionenstrommessung und Einige Neuere Anwendungen dieses Messverfahrens am Ottomotor", MTZ, No. 9 (Sep. 1961), pp. 337-343.

Primary Examiner—Stewart J. Levy
Assistant Examiner—John E. Chapman, Jr.
Attorney, Agent, or Firm—Bacon & Thomas

[57] ABSTRACT

A measuring circuit for the ionic current measurement in the combustion chamber of an Otto engine is disclosed. The circuit has an ignition transformer the secondary coil of which supplies an ignition circuit. On the side carrying the positive voltage of the ignition pulse, the coil is connected to ground and, on the side carrying the negative voltage of the ignition pulse, it is connected to the ignition spark gaps via a distributor. The circuit has, inserted into the ignition circuit, a parallel circuit of a high-voltage Zener diode connected in the non-conducting direction related to the ignition current, and a capacitor as the measuring voltage source. The present invention supplies the measuring voltage to the ignition spark gap without circuit elements influencing its sensitivity. A parallel circuit is connected between the side carrying the positive voltage of the secondary coil and ground. The secondary coil is connected via diodes immediately to the ignition spark gaps such that the anode of each diode is connected to the side of the secondary coil carrying the negative voltage of the ignition pulse. A coupling capacitor for decoupling of an ionic current signal is coupled to the primary winding of the ignition transformer.

1 Claim, 1 Drawing Figure

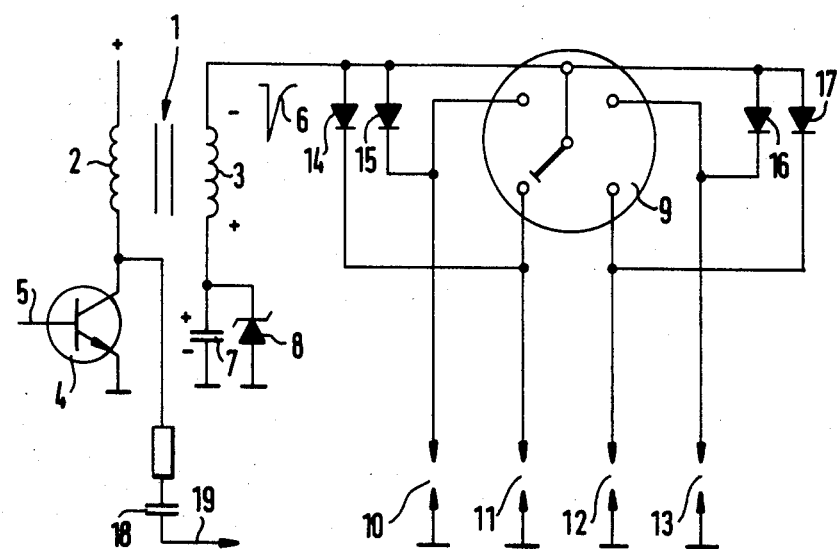

MEASURING CIRCUIT FOR IONIC CURRENT MEASUREMENT

BACKGROUND OF THE INVENTION

1. Field of the Invention

The invention relates to a measuring circuit for the ionic current measurement in the combustion chamber of an Otto engine. The current comprises an ignition transformer the secondary coil of which supplies an ignition circuit which, on the side carrying the positive voltage of the ignition pulse, is connected to ground. On the side carrying the negative voltage of the ignition pulse, it is connected to the ignition spark gaps via a distributor. The invention further comprises, inserted into the ignition circuit, a parallel circuit of a high-voltage Zener diode connected in the non-conducting direction related to the ignition current and of a capacitor as the measuring voltage source.

2. Description of the Prior Art

Irregular variations of the combustion, particularly pressure shocks during the combustion in the combustion chambers of an Otto engine are known as knocking. This is extremely detrimental for the engine and should be avoided.

It is known that pressure variations occuring during knocking become apparent in variations of the ionization and thus of the ionic current across the ignition spark gap. Consequently, it is possible to detect knocking by the measurement of the ionic current within the combustion chamber during or particularly subsequent to the ignition spark.

A circuit of this kind is described in U.S. Pat. No. 4,359,893. Therein the high-voltage Zener diode is connected to the side carrying the negative high-voltage of the ignition pulse of the secondary coil so that the measuring voltage applied to the ignition electrode is positive. The positive measuring voltage on the voltage-carrying electrode of the ignition spark gap is desired per se because one obtains a higher usable signal in the case of usual spark plugs on the basis of their geometrical configuration. However, in the case of this circuit, one needs a special line-path in order to transfer the measuring voltage from the capacitor to the ignition spark gap. Within this line-path, in addition, high-ohmic resistors are required which block the ignition voltage. However, these high-ohmic resistors also reduce the usable measuring signal of the ionic current so that a usable signal is scarcely available. This low measuring signal is to be passed to the analyzing circuits via shielded lines and charge amplifiers. In fact it is possible to use such as arragement in a measuring laboratory, but same is not suitable for standard applications.

SUMMARY OF THE INVENTION

The invention provides a configuration of a measuring circuit such that a measuring voltage can be applied to an ignition spark gap without the circuit elements influencing the sensitivity, and that a proper evaluation of the measuring voltage is possible in standard applications.

According to the invention, this object is achieved by a parallel circuit connected between the side carrying the positive voltage of the secondary coil and ground, and that the secondary coil is connected via diodes immediately to the ignition spark gap. The anode of each diode is connected to the side of the secondary coil carrying the negative voltage of the ignition pulse and a coupling capacitor for the decoupling of the ionic current signal is coupled to the primary winding of the ignition transformer.

The invention differs in a non-obvious manner from the prior art in that the measuring voltage source is connected on the low-voltage side of the ignition coil. The measuring voltage is supplied via diodes to the spark plugs bridging-over the ignition distributor. Therefore, in the measuring circuit, circuit elements for the blocking of the high voltage are not necessary. The ignition transformer serves as transducer for the measuring signal due to the fact that the ignition transformer is considered as low-ohmic for the measuring frequencies. This transducer has high-voltage durably by its construction as ignition transformer so that any influence on the ignition circuit is impossible and any additional high-voltage resistent circuit elements are not required.

BRIEF DESCRIPTION OF THE DRAWINGS

One embodiment of the invention will be described in the following with reference to the accompanying drawing of a circuit of the invention.

DESCRIPTION OF THE PREFERRED EMBODIMENT

The circuit arragement as shown comprises an ignition transformer 1 with a primary coil 2 and a secondary coil 3. The primary coil 2 is connected to the collector circuit of a switching transistor 4. On the base line 5 the trigger pulse for the ignition pulse is transmitted. For triggering the ignition pulse, the switching transistor 4 is cut off so that a magnetic field in the primary coil 2 breaks down and in the secondary coil 3 a high voltage is induced which generates an ignition pulse 6.

The ignition pulse 6 appears on the secondary coil 3 with the indicated polarity. The side carrying the positive voltage of the secondary coil 3 is connected to ground via a parallel circuit of a capacitor 7 and of a Zener diode 8. The side carrying the negative voltage of the secondary coil 3 is connected via an ignition distributor 9 with the ignition spark gaps 10, 11, 12, 13 of specific spark plugs in the combustion chambers. For the positive measuring voltage diodes 14, 15, 16, 17 bridge the ignition distributor 9 and are connected in the indicated polarity so that anodes of the diodes 14, 15, 16, 17 are connected to the side carrying the negative voltage of the ignition pulse 6 of the secondary coil 3.

A coupling capacitor 18 and an output line 19 are connected to the primary coil 2 of the ignition transformer 1.

In each case, ignition pulse 6 causes a current flow into the described ignition circuit and through the measuring voltage source so that the Zener voltage drops over the high-voltage Zener diode 8 and the capacitor 7 is charged to a positive voltage. This voltage drop over the high-voltage Zener diode 8, or the charging voltage of the capacitor 7 respectively is 200 to 500 V. The voltage of the ignition pulse 6 is not influenced markedly. After decreasing of the ignition pulse the capacitor 7 represents a measuring voltage source which discharges via the ignition circuit and particularly via a specific ignition spark gap as ionized. This current flow depends of the ionization of the ignition spark gap so that fluctuations of this ionization effect a modulation of the discharging current of the capacitor. Thereby it is possible to detect knocking conditions.

The variations of the discharing current of the ionic current are transduced via the ignition transformer 1 to the primary coil 2. The ignition transformer 1 has a low resistance for the substantially low-frequency variations of the ionic current in a frequency range between 8 and 15 kHz so that the discharging current or the measuring current is not influenced by this. In addition, a high usable signal is available on the primary side. The voltage variations caused by the ionic current are decoupled via the coupling capacitor 18 and are transmitted on the output line 19 as knocking signal to evaluation circuit arrangements.

We claim the following:

1. A measuring circuit for ionic current measurement in the combustion chamber of an Otto engine comprising an ignition transformer the secondary coil of which supplies an ignition circuit and which, on the side carrying the positive voltage of the ignition pulse, is connected to ground and, on the side carrying the negative voltage of the ignition pulse, to the ignition spark gaps via a distributor, and further comprising inserted into the ignition circuit a parallel circuit of a high-voltage Zener diode connected in the non-conducting direction relative to the ignition current and of a capacitor as a measuring voltage source, characterized in that the parallel circuit is connected between the side carrying the positive voltage of the secondary coil and ground and that the secondary coil is connected via diodes immediately to the ignition spark gaps, whereby the anode of each diode is connected to the side of the secondary coil carrying the negative voltage of the ignition pulse and that a coupling capacitor for decoupling of an ionic current signal is coupled to the primary winding of the ignition transformer.

* * * * *